(12) United States Patent
Steinmetz et al.

(10) Patent No.: US 6,421,703 B1
(45) Date of Patent: Jul. 16, 2002

(54) PROCESS AND SYSTEM FOR CONTROLLING THE USE OF SOFTWARE

(75) Inventors: Daniel Steinmetz, Montmorency; Michel Evangelou, Melun, both of (FR)

(73) Assignee: Actikey (FR)

( * ) Notice: Subject to any disclaimer, the term of this patent is extended or adjusted under 35 U.S.C. 154(b) by 0 days.

(21) Appl. No.: 09/106,358

(22) Filed: Jun. 29, 1998

(30) Foreign Application Priority Data

Jun. 30, 1997 (FR) .............................. 97 08210

(51) Int. Cl.[7] .............................................. G06F 9/00
(52) U.S. Cl. ........................ 709/102; 709/200; 709/328; 709/331
(58) Field of Search ................................. 709/100, 101, 709/102, 103, 104, 105, 106, 108, 200, 205, 208, 328, 330, 331

(56) References Cited

U.S. PATENT DOCUMENTS

| | | |
|---|---|---|
| 5,182,770 A | 1/1993 | Medveczky et al. |
| 5,432,937 A * | 7/1995 | Tevanian et al. ............ 709/100 |
| 5,450,567 A | 9/1995 | Mori et al. |
| 6,212,575 B1 * | 4/2001 | Cleron et al. ............... 709/328 |

FOREIGN PATENT DOCUMENTS

| | | |
|---|---|---|
| EP | 0 613 073 | 8/1994 |
| FR | 2 740 236 | 4/1997 |
| WO | 88/05941 | 8/1988 |

* cited by examiner

*Primary Examiner*—Majid A. Banankhah
(74) *Attorney, Agent, or Firm*—Larson & Taylor, PLC

(57) ABSTRACT

This is a process and a system for controlling the use of software developed under a specified platform, associated with a device, in which signals are processed in the device and/or are returned from the device to the computer in response to signals transmitted from this computer. The circuit of the device is written to and read from by calling upon a function built into an object file (.OBJ) or a Dynamic Library file (.DLL), the function having the following form: result=cnrm(var1, var2, . . . varn) with n>3. The function is devised so as automatically to detect the type of specified platform, and calculate the software execution context as a function of the platform.

14 Claims, 4 Drawing Sheets

PROCESS AND SYSTEM FOR CONTROLLING THE USE OF SOFTWARE

The present invention relates to a process for controlling the use of software developed under a specified platform, associated with a device provided with an electronic circuit with read/write retentive memory, connected to the terminals of a parallel port between a computer and a peripheral apparatus, in which signals are processed in the device and/or are returned from said device to the computer in response to signals transmitted from this computer.

The term platform is understood to mean an environment corresponding to a specified operating system, such as the Windows™ environment, the Unix™ environment or other environments (Apple™, for example), which call in particular upon dynamic link libraries (DLL, the initials of Dynamic Lien Librairy It is known that dynamic link libraries (DLLs) constitute an important utility within operating systems. DLLs offer the possibility of connecting prewritten modules into the operating system. This makes it possible for the applications to share the common coding, to modularize the regularly used functions and to provide a degree of expandability.

The present invention also relates to a system for the interactive control of the use of software items.

It finds a particularly important although nonexclusive application in the field of protection against the copying of software items which is used on microcomputers under a 16-bit and 32-bit Windows™ platform.

Methods are already known for protecting software items stored, for example, on diskettes making it possible to preclude the copying of these diskettes.

The first method of protection consists in short-circuiting the microcomputer program portion which reads the diskettes.

A second method consists in marking the diskette in an irreversible manner by destroying a particular site on the magnetic medium with a laser ray.

The two methods mentioned above have drawbacks in particular because they prevent the user from making a backup copy of his programs.

A third method consists in marking the computer by means of an electronic device, sometimes called a key.

The program, while it is executing, will then verify the presence of this key consisting of an electronic circuit which returns codes when it is requested.

This circuit can be housed directly in one of the computer's expansion connectors, or more simply be plugged into one of the external sockets or ports, for example that of the printer, without thereby disturbing the operation of the latter.

It is thus possible to copy the software at will. This system which has been further improved by making the keys directly programmable by virtue of a read/write retentive memory is by far the most effective.

However, it has a number of drawbacks.

Thus, in software items which currently operate on a specified platform, and more particularly those which operate on a Windows™ platform (16 and 32 bits), problems arise regarding the compatibility of the systems used during the programming by the programmer of the key as a function of the languages and/or generations of software which it uses.

The present invention aims to provide a process and a system for controlling the operating of software which is better than those previously known at meeting the requirements of practice, in particular in that it makes it possible to avoid the drawbacks mentioned above, and in that it makes it possible, through simplified installation procedures, henceforth to be unconcerned with the end platform on which the application will operate.

With said invention, the programmer will therefore authorize or otherwise the operation of the software protected in an optimized manner, this being a particularly advantageous technical result in an era in which the pirating of software is unfortunately on the increase.

To this end, the invention proposes in particular a process for controlling the use of software developed under a specified platform, associated with a device provided with an electronic circuit with read/write retentive memory, connected to the terminals of a parallel port between a computer and a peripheral apparatus, in which signals are processed in the device and/or are returned from said device to the computer in response to signals transmitted from this computer, characterized in that the circuit of the device is written to or read from by calling upon a function built into an object file (.OBJ) or a Dynamic Library file (.DLL) previously inserted into said software, said function having the following form:

result=cnrm(var1, var2, . . . varn) with n>3 in which var1 to varn correspond to particular values depending on what it is desired to execute with the device and to at least one specific value corresponding to a specified user, said function being devised so as automatically to detect the type of specified platform, and calculate the software execution context as a function of said platform.

After the call, var1 to varn contain result values dependent on the action executed and hence on the values given during the call. Result will contain the value of var1 after the call.

More precisely the software interface which makes it possible to read from and write to the key takes the following forms:

an object file (.OBJ) to be used for the programs written in compiled languages such as C or pascal, for which calling complies with what is described above, or a dynamic library (.DLL) to be used by the programs written in interpreted or semicompiled languages (VISUAL BASIC, WINDEV), but also in certain cases with compiled languages.

Advantageously, during the implementation of the linking function (Login) between the software and the device, the key and/or its position are identified by way of a specific value (cfgFun or cfgKey), for example given by the software, or obtained while exploring the successive keys, and this specific value is stored in memory and used later as a constant when operating said software.

In an advantageous embodiment the function cnrm is devised (function cnrmcb) so as to recall the software at least once while operating, so as to verify that it is indeed the original function cnrm which has been called.

The term original function cnrm is understood to mean the function which has been designed and provided to operate originally with the device, by the constructor of the device.

In an advantageous embodiment, the specified platform is a Windows™ platform, said function cnrm being devised so as to allow automatic recognition of the type of passing of parameters by reference or by value implemented within the software.

Let us recall that in this case, by virtue of the nature of certain programming languages, the dynamic library is in reality constructed in the form of two dynamic libraries:

a dynamic library with passing of parameters by reference, for which calling complies with what is described above, that is to say for which Result contains the value var1 after the call (i.e. a first DLL file for 16-bit application and a second DLL file for 32-bit application), a dynamic library with passing of parameters by value for which an additional parameter makes it possible to define which value from var1 to varn is to be placed in Result after the call. (i.e. a third DLL file for 16-bit applications and a fourth DLL file for 32-bit applications).

Prior to the invention, additional mechanisms were necessary during operation under the WINDOWS NT operating system for a 16-bit application (written for WINDOWS 3.xx).

The programmer was in effect obliged to use a dynamic library even for a compiled language, this being so that the first DLL file can be replaced by a fifth DLL file specific to the WINDOWS NT environment.

This fifth specific DLL file then itself called a sixth 32-bit DLL file specific to WINDOWS NT which in turn called the peripheral/central processing unit interface module (or driver) responsible for the inputs/outputs to the key.

The same type of mechanism had to be used for the third DLL file in the case of the passing of parameters by reference.

To summarize, the following cases in point existed under the Windows™ platform before the invention:

With a 16-bit application with compiled programs when using the .OBJ library, operations were performed exclusively under 16-bit WINDOWS.

When using the first DLL file (16-bit WINDOWS version) it was however necessary to replace this first DLL file by a special NT version to provide a sixth special DLL file for WINDOWS NT and to install the NT driver.

With a 16-bit application with semicompiled or interpreted programs, if the application allows the passing of parameters by references, when using the first DLL file (16-bit WINDOWS version) to operate under WINDOWS NT it was necessary to replace this first DLL file by a special NT version, to provide a fifth special file for WINDOWS NT and to install the NT driver.

However, if the application did not allow the passing of parameters by references when using the third DLL file (16-bit WINDOWS version) to operate under WINDOWS NT it was necessary to replace this third DLL file by a special NT version, to provide another special DLL for WINDOWS NT and to install the NT driver.

With a 32-bit application with compiled programs, when using the .OBJ library, operations were on the other hand performed exclusively under 32-bit WINDOWS (WINDOWS 95 or WIN32S). Operations were not carried out under NT, in which case a specific .OBJ is necessary and hence two different programs are necessary for the 32 bits.

When using the second DLL file (32-bit WINDOWS version) to operate under WINDOWS NT it was, on the other hand, necessary to replace the second DLL file by a special NT version and to install the NT driver.

Finally, with a 32-bit application with semicompiled or interpreted programs, if the application allowed the passing of parameters by references, when using the second DLL file (32-bit WINDOWS version) to operate under WINDOWS NT it was necessary here again to replace the second DLL file by a special NT version and to install the NT driver.

On the other hand, if the application did not allow the passing of parameters by references, when using the fourth DLL file (32-bit WINDOWS version) to operate under WINDOWS NT it was necessary to replace this fourth DLL file by a special NT version and obligatory to install the NT driver.

Such processes therefore have drawbacks.

Indeed the number of DLLs and the differentiation between DLLs depending on the execution platform oblige the users to consider all the cases in point and to have a complex installation procedure.

The compiled programs are compelled to use obligatorily a DLL so that they can be ported to NT without compilation.

An understanding of the various possible cases is therefore not obvious and led programmers to make errors, and this increased the costs of intervention when installing and using softwares and thereby gave rise to unsatisfactory technical effects.

Since the specified platform is a Windows platform, and/or said function cnrm is devised so as to allow automatic recognition of the type of passing of parameters by reference or by value implemented within the software, these various drawbacks are alleviated.

Conventionally, before any key manipulation, it is known that an operation referred to hereafter as Login is performed.

Login is in effect an action which is necessary in order to be certain of reading from and writing to the correct key.

According to one embodiment of the invention, with each call of cnrm, the editor codes will thus, for example, be passed in the variables var2, var3 so as to validate the correct key.

During key login, a memory area (stack) associated with login is then allocated and will store the return values of var1 to varn and also the elements of the platform-specific execution context.

To allow the recognition and automatic passing of parameters by reference and by value, the call to the cnrm function is supplemented with a function cnrmvar whose objective is to retrieve the post-call contents of var1 to varn.

Its form is as follows:

Result=cnrmvar(login handle, index of the variable (1 to n)).

It will be used instead of the corresponding variable.

For example, in an advantageous embodiment of the invention where the value n is equal to 8, instead of using a method of the type:

var1=12; {register read}
var2=code0; {editor cord}
var3=code1; {editor code}
var4=key 0; {editor password}
var5=0;
var6=0;
var7=5; {index of the register to be read}
var8=0;
res=cnrm (var1, var2, var3, var4, var5, var6, var7, var8);
if (var1==True {
    . . .
}

An assignment is provided as follows:
var1=12; {register read)
var2=code0; {editor code}
var3=code1; {editor code}
var4=key 0; {editor password}
var5=0;
var6=0;

```
var7=5; {index of the register to be read}
var8=0;
res=cnrm (var1, var2, var3, var4, var5, var6,
var7, var8);
if (cnrmvar(cfgLog, 1)==True {
 . . .
}
```

At the time of the call, the function cnrm will analyze the contents of the stack. If it finds the editor codes in the stack then it will know that this is a passing by value, otherwise this is a passing by reference.

It should be noted that this mechanism requires that the software interfaces be customized based on editor, that each editor-based interface be capable of recognizing the editor codes in the stack, and that each editor possess different codes, this being provided for and implemented by the manufacturer of the keys.

In this way the programmer need no longer concern himself with the mode of parameter passing, and can choose the mode which he desires when he desires. When using semicompiled programs implementing parameter passing by value only, it will have a mode of operation and a principal of writing which is identical to that for a program compiled with parameter passing by reference.

The call to the function cnrm is made uniform and the calls can be made in the same way, irrespective of the language.

In an advantageous embodiment the execution context is set up once only, during the first implementation of the function linking the software and the device (input login).

This thereby affords the maximum performance in respect of the other calls to the function cnrm.

Advantageously the process additionally comprises the implementation of a method of protection in which a few sensitive functions of the software to be protected are chosen, the entry point of these functions is masked by an indirect call, and the structure which contains the entry point of said functions is encrypted.

Thus, it is certain that the key has indeed been read, otherwise decryption is not carried out, the entry points of the functions not being found.

Stated otherwise, if a normal user having a license does not put in his key, he will obtain the "key absent" message.

If a pirate tries to replace the key or to delete the test for the presence of the key, decryption is not carried out, and in this case the entry points of the functions are not found.

The encryption is advantageously carried out by an external program after compilation and link editing. It can for example use a so-called TAG1 string which must be unique in order to find the area to be encrypted and the length of said area. More generally, the encryption tool will be adapted by the programmer as a function of his specific requirements.

The invention also relates to a system implementing the process described above.

It likewise relates to a system for controlling the use of software developed under a specified platform, comprising a device provided with an electronic circuit with read/write retentive memory, connectable to the terminals of a parallel port between a computer and a peripheral apparatus, devised so as to process and/or return signals to the computer in response to signals transmitted from the latter, characterized in that the system comprises means for writing to and reading from the circuit of the device by calling upon a function built into an object file (.OBJ) or a Dynamic Library file (.DLL) previously inserted into said software, said function having the following form:

result=cnmr(var1, var2, . . . var8)

in which var1 to var8 correspond to particular values depending on what it is desired to execute with the device and to at least one specific value corresponding to a specified user, said function being devised so as automatically to detect the type of specified platform, and calculate the software execution context as a function of said platform.

Advantageously the system moreover comprises means for automatically recognizing the type of passing of parameters by reference or by value implemented within the software.

The invention will be better understood on reading the description of embodiments given below by way of non-limiting example, by making reference in particular to various tables.

The description refers also to the drawings which accompany it, in which.

Figure 1:
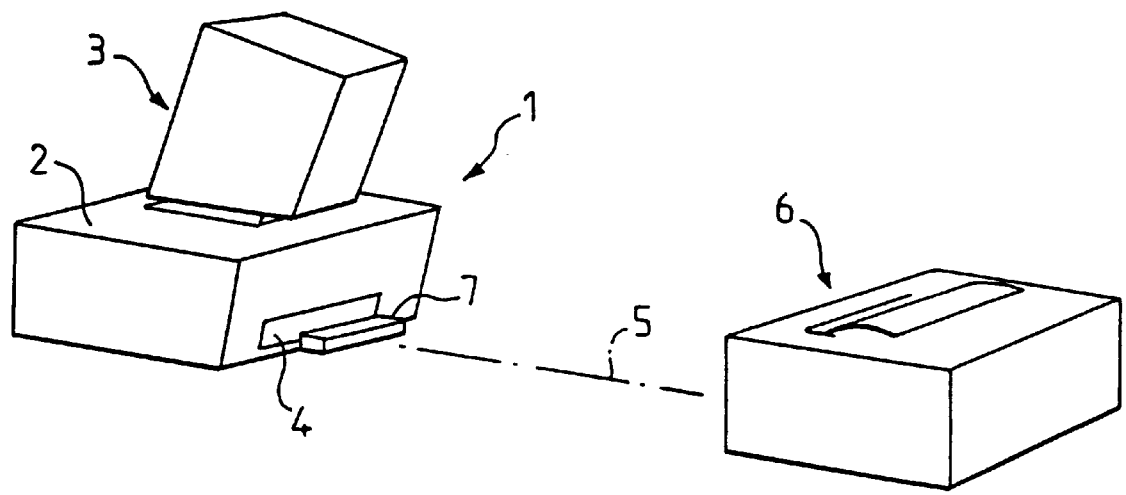
FIG. 1 is a schematic, perspective view of a microcomputer equipped with a device according to the invention plugged into the parallel port for connection with the printer.

FIG. 1 shows a microcomputer 1 comprising a box 2 and a screen 3.

The box is provided with a parallel-port socket 4 for connection via a cable 5 with a peripheral apparatus which in this instance is a printer 6.

The microcomputer 1 which is programmed with protected software is fitted, on its parallel port, with a device 7 corresponding to said protected software, in the form of a double connector, which can be plugged into the parallel port of the computer at one end and into another device box or the cable of the printer 5 at the other end.

Figure 2:
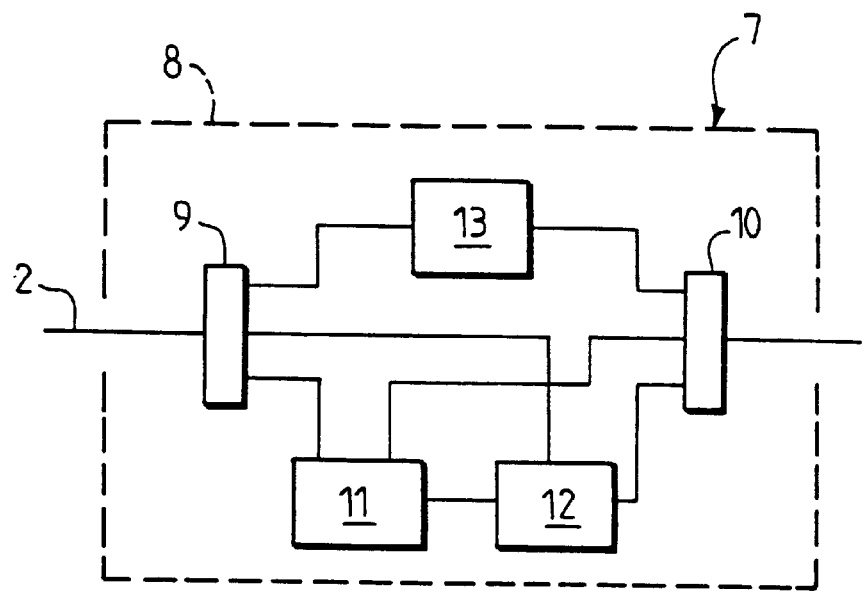
FIG. 2 is a general block diagram of an electronic device belonging to the system according to the invention.

More precisely, with reference to FIG. 2, the device according to the embodiment of the invention more particularly described here 7 comprises a box 8 fitted with two sockets 9 and 10 for plugging into a parallel port which are known per se and are of standard type with 25 pins at the microcomputer end and of a corresponding female type at the printer end.

The device 7 according to the invention comprises connected to the male plug 9 linked to the microcomputer 2 a circuit 11, itself connected on the one hand to the female socket 10 and on the other hand to the handler circuit 12.

The device 7 is for example of the type described in the document 2,740,236 incorporated herein by reference, and which will therefore not be detailed further.

Within the framework of the embodiments of the invention which are more particularly described here, envisaged below is the case of the (16- and 32-bit) Windows™ platforms.

Figure 3:
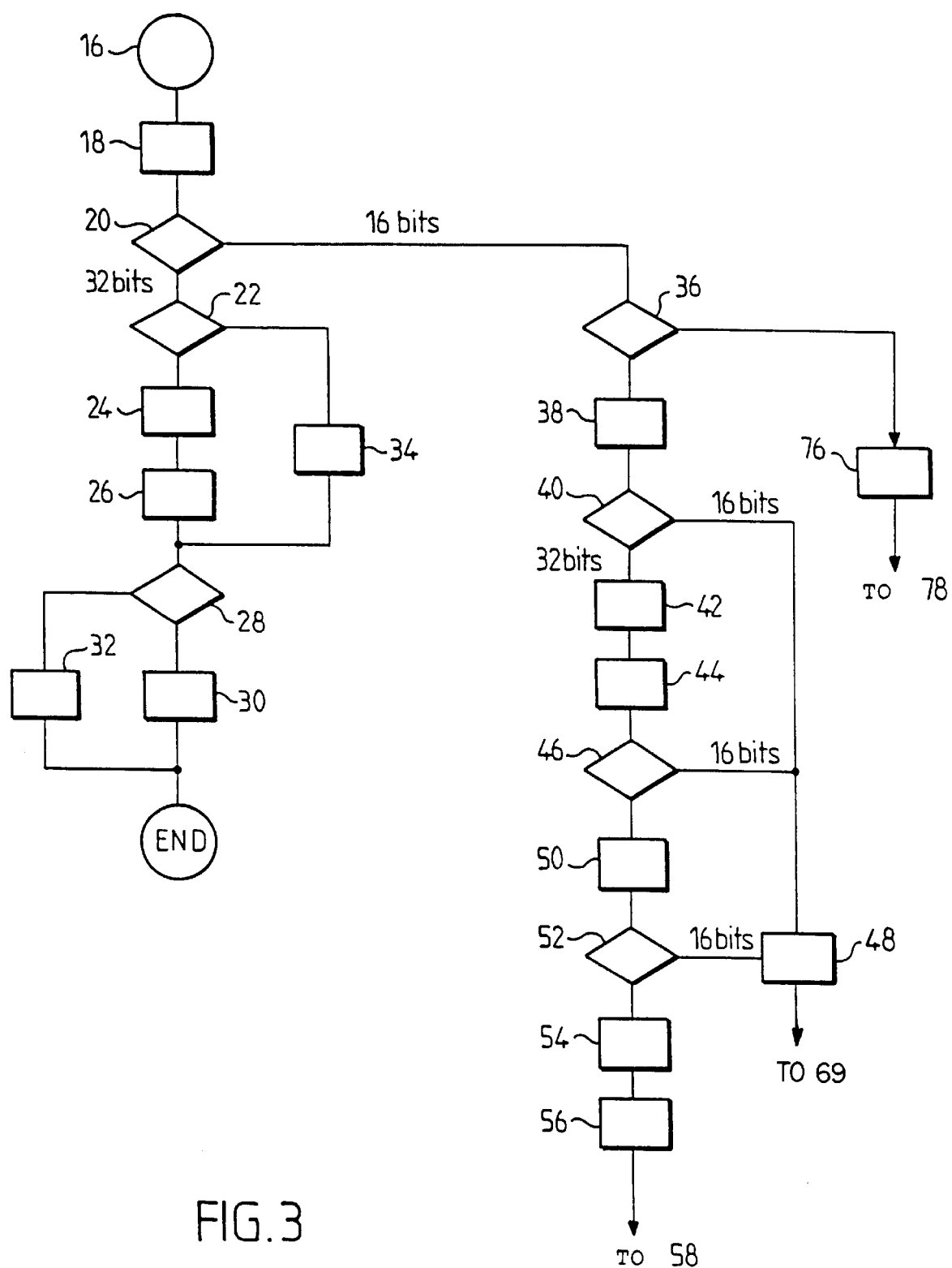
FIGS. 3 and 4 show a flowchart giving the operating steps of the control system and process according to the embodiment of the invention more particularly described here.
Figure 4:
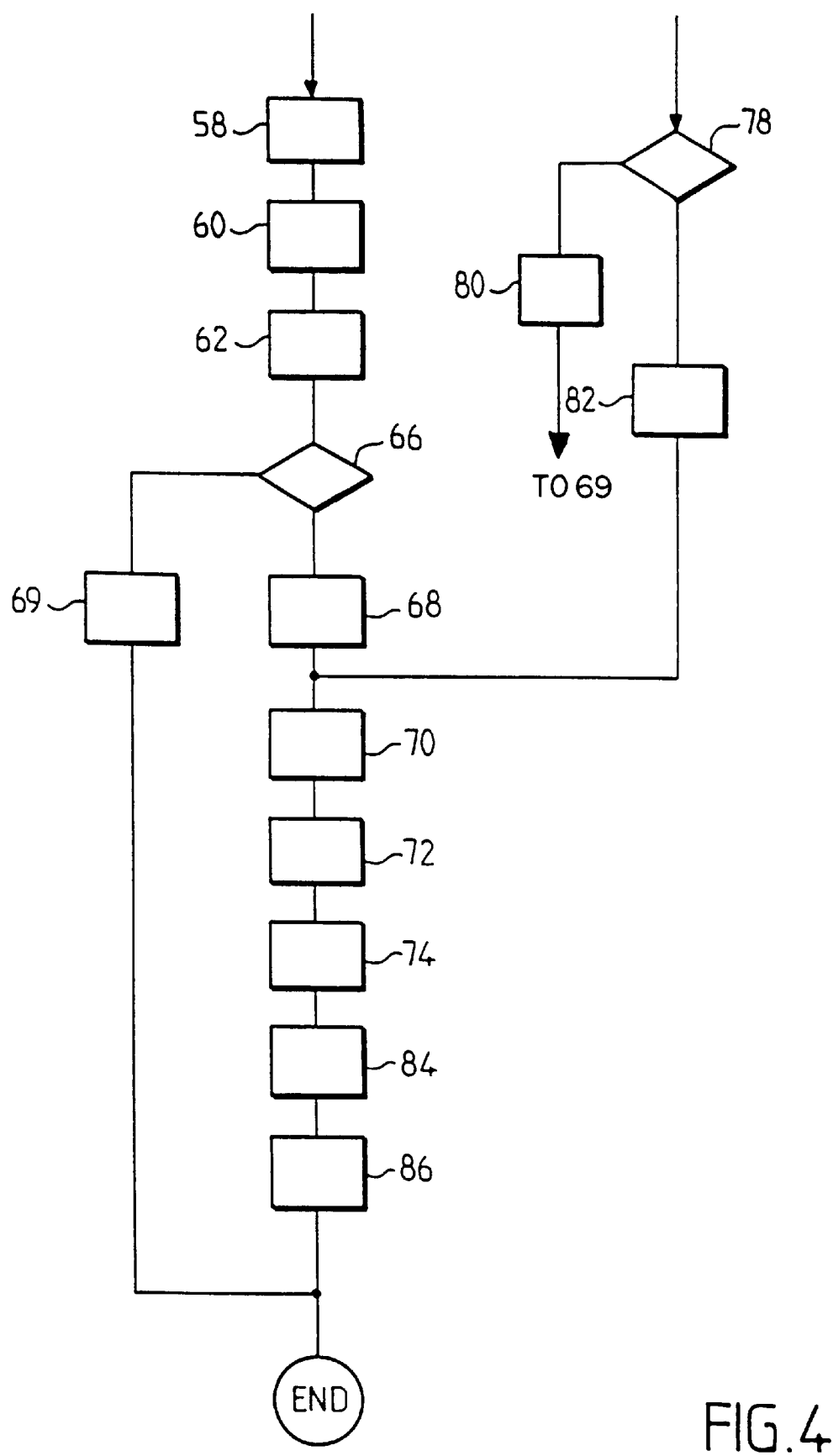

Passing by value and by reference having already been described hereinabove, the setting up of the execution context according to the Windows™ platform will now be specified by referring in particular to FIGS. 3 and 4.

In what follows, the libraries and programs used therefore make particular reference to those of the American company Microsoft. They may be consulted further in guides such as and for example the "API Bible" or "Windows 95, Win32 programming of APIs—The expert's secrets" published by Simon & Schuster Macmillan.

Thus, APIs such as getVersion, or DLLs such as GetProcAddress32W, will be implementable without supplementary explanation.

An embodiment of the algorithm for context calculation and management according to the embodiment of the invention more particularly be described here will now be detailed, the memory area during login containing the context information.

Let us recall that during login of the key, cnrm will automatically carry out recognition of the platform and set up the appropriate execution context. This context is advantageously calculated once only.

To do this, after switching on the computer (step 16) and loading the protected software while setting up the key (step 18), cnrm will identify (step 20) whether the environment is 16 or 32 bits) To do this, the memory area allocated during Login contains the context information.

32-bit operation will now be detailed.
If the environment is 32 bits
During login (test 22):
Search for platform by the API getVersion (step 24)
Storage in memory of the fact of being under NT or not (step 26)
Depending on the platform (test 28), the internal routines of cnrm are called in order to talk to the key (step 30), or the cnrm driver is called for WINDOWS NT (step 32).
During the other calls (step 34):
Depending on the platform (test 28), the internal routines of cnrm are called in order to talk to the key (step 30), or the cnrm driver is called for WINDOWS NT (step 32).
If the environment is 16 bits
During login (test 36):
Platform search by the API getVersion (step 38)
If the version is <=3.10 (test 40) then we are definitely not under WINDOWS NT and hence 16-bit operation can continue normally (step 48), that is to say call the internal routines of the cnrm function (see step 69 below)
If the version is >3.10 then we are under a 16- or 32-bit version
The version will then be retrieved by going into 32-bit mode (step 42)
Loading of the dynamic library KRNL386.DLL (16 bits) (step 44)
If loading fails (step 46), we are certainly on a 16-bit platform (step 48)
If loading does not fail
the following functions will be loaded dynamically (step 50)
GetProcAddress32W
LoadLibraryEX32W
CallProc32W
FreeLibrary32W
If one of these functions does not exist (loading failure) (test 52) we are definitely on a 16-bit platform only (48).
Otherwise, we are on a 32-bit platform, the DLL KERNEL32.DLL will be loaded dynamically (step 54) by virtue of the previously loaded LoadLibrary32W.
The getVersion (32 bits) function of the KERNEL32.DLL module will be loaded dynamically (step 56) by virtue of the previously loaded getProcAddress32W.
getVersion (32 bits) is called (step 58) by way of callProc32W loaded previously, and hence the version number of the 32-BIT platform being run is obtained.

This version number allows us to ascertain whether we are on NT or not.
Storage in memory of the fact of being under NT or not (step 62)
Depending on the platform (test 66), the internal routines of cnrm are called (step 69) so as to talk with the key, or the cnrm driver is called (step 68) for WINDOWS NT as follows:
The following functions will be loaded dynamically (step 70) (they are definitely there in KRNL386.DLL since they have already been loaded during Login):
GetProcAddress32W
LoadLibraryEX32W
CallProc32W
FreeLibrary32W
GetVDMPointer32W (a function making it possible to convert addresses from the 16-bit world to the 32-bit world)
The following functions from KERNEL32.DLL will then be loaded (step 72) (by way of LoadLibraryEX32W and GetProcAddress32W):
CreateFileW
DeviceIoControl
CloseHandle
so that the NT driver can be called directly (step 74) in 32-bit mode.
During the other calls (test 36, step 76)
Depending on the platform (test 78), the internal routines of cnrm are called (step 80) so as to talk with the key (step 69), or the CNRM driver is called (step 82) for WINDOWS NT as follows:
The following functions will be loaded dynamically (step 70) (they are definitely there in KRNL386.DLL since they have already been loaded):
GetProcAddress32W
LoadLibraryEX32W
CallProc32W
FreeLibrary32W
GetVDMPointer32W (a function making it possible to convert addresses from the 16-bit world to the 32-bit world).
The following functions from KERNEL32-DLL will then be loaded dynamically (step 72) (by way of Load LibraryEX32W and GetprocAddress32W):
CreateFileW
DeviceIoControl
CloseHandle
in order to call directly (step 74) the NT driver in 32 bit mode.
All the 16-bit pointers are then converted into 32-bit pointers by GetVDMPointer32 (step 84), as during Login, this not having been described hitherto.
The driver is called (step 86) by calling the functions CreateFileW, DeviceIoControl and CloseHandle by way of the function CallProc32W.
The function cnrm will now be described more precisely.
Cnrm makes it possible to carry out numerous actions with regard to the key. All these actions (also referred to as functions in what follows) can be accessed via a unique function called "cnrm" of the general form:
integer cnrm (reference var1, reference var2, reference var3, reference var4, reference var5, reference var6, reference var7, reference var8)
When using the C language we will have for example:
Declaration in C: Int cnrm (int *var1, int *var2, int *var3, int *var4, int *var5, int *var6, int *var7, int *var8);

When using Pascal, we have: Declaration in Pascal:
Function cnrm(var var1, var2, var3, var4, var5, var6, var7, var8: integer): integer;

It will be noted depending on the languages, that it may be necessary to qualify these prototypes more precisely, for example WINAPI will be used under Windows.

These elements are within the scope of the person skilled in the art.

The actions are moreover grouped together into various categories depending on the embodiment given below by way of example:

The pure local actions

Function 00: Test presence of key in the local machine
Function 01: Initialization of the key password if it is not initialized The Login and Logout actions:

Function 02: Login on a particular key or on the first one found
Function 03: Logout on a key for which a login has been performed
All the other actions may only be executed if a Login has been successful and up to the corresponding Logout.

The actions for latching registers of the key:
Function 04: Writing of the protection register (defined for the write-protected registers)
Function 05: Reading of the protection register (reading of the number of protected registers)

The actions of reading from and writing to registers of the key
Function 06: Writing of a Far Buffer to the key
Function 07: Reading of the contents of the key from the Far Buffer
Function 08: Writing of a near Buffer to the key
Function 09: Reading of the contents of the key from a near Buffer
Function 10: Writing of two integers to two consecutive registers
Function 11: Reading of two integers from two consecutive registers
Function 12: Writing of an integer to a register
Function 13: Reading of an integer from a register
Function 14: Writing of a byte to a register
Function 15: Reading of a byte from an 8-bit register
Function 16: Writing of a bit to a register
Function 17: Reading of a bit from a register
Function 18: Writing a value from register X to register Y
Function 19: Incrementation (+) or decrementation (−)
Function 20: Right (+) or left (−) rotation
Function 21: Right (+) or left (−) shift
Function 22: Writing of a date
Function 23: Reading of a date The actions for managing the encryption key and encryption/decryption
Function 25: Writing of a far encryption key
Function 26: Reading of a far encryption key
Function 27: Writing of a near encryption key
Function 28: Reading of a near encryption key
Function 29: Far text encryption according to encryption key
Function 30: Far text decryption according to encryption key
Function 31: Near text encryption according to encryption key
Function 32: Near text decryption according to encryption key The actions for reading and writing system information from and to the key
Function 24: Reading the date of manufacture
Function 34: Writing final user code
Function 35: Reading the final user code
Function 36: Writing the SSII code
Function 37: Reading the SSII code
Function 38: Reserving the registers for an SSII
Function 39: Reading the number of registers for an SSII
Function 40: Writing the multiprotection code
Function 41: Reading the multiprotection code
Function 42: Reading the national distributor code
Function 43: Reading the cheksum
Function 44: Reading the serial number The actions specific to the keys on a network
Function 46: Network: Writing the maximum number of users
Function 47: Network: Reading the number of network users The actions specific to the clock keys
Function 50: Initializing the date and the time in the clock.
Function 51: Reading the date and the key time with clock
Function 52: Key with clock with alarm write
Function 53: Key with clock with alarm read
Function 54: Key with clock with status read
Function 55: Key with RAM/CLOCK Clock Write
Function 56: Key with RAM/CLOCK Clock Read The actions specific to the microprocessor keys
Function 48: EEPROM save to microprocessor
Function 49: EEPROM initialization from the microprocessor The functions 33 and 45 are reserved in the example more particularly described here.

The function cnrm returns an integer (16 or 32 bits depending on whether the environment is 16 or 32 bits).

It always receives 8 parameters var1 to var8 passed by reference (pointers) whose value must be initialized before the call, and whose value after the call depends on the action requested.

Before the call, the contents of the variables var1 to var8 follow a convention which is always the same.

After the call, the contents of the variables depend on the action requested and always follow a specified model. The value returned makes it possible to ascertain whether the action has succeeded or not, and in the event of success var1 takes a value called True (the value of true is specific to each editor just like the editor codes).

For certain actions (Function 0, Function 1 and Function 2 only), a value called CfgFun which defines a particular position of the key can, by addition, be combined with the contents of var1.

We thus have a general format and contents for the variables of the following type:

Before the call:
    cfgLog=cnrm (reference var1, {number of action parameter (function) [+cfgFun]}
    reference var2, {Code customer 0=code0)
    reference var3, {code customer 1=code1)
    reference var4, {password (key0) or var4 received from the "LOGIN" action)
    reference var5, {parameter specific to the action desired}
    reference var6, {parameter specific to the action desired}
    reference var7, {parameter specific to the action desired}
    reference var8, {parameter specific to the action desired})

For the functions 0, 1 and 2, var4 must contain the password key0 when calling cnrm.

For all the other functions, var4 must contain the value received in var4 during login (Function 2).

After the call:
For the functions 0 and 1:
cfgLog: always 0
  var1: True if the action has succeeded
Some other value in the event of failure
For all the other functions: cfgLog can be equal to 0. In this case var1 is equal to 0 and var8 contains an error code
  cfgLog can be different from 0. In this case var1 contains a value which may be
  0: There is an error code in var8 True: The action has succeeded Some other value: Key not found
In all cases:
  var2: A value specific to the action requested (cfgKey for functions 0, 1 and 2)
  var3: A value specific to the action requested (cfgFun for functions 0, 1 and 2)
  var4: A unique value which can no longer be modified hereafter (Identical to cfgLog)
  var5: A value specific to the action requested
  var6: A value specific to the action requested
  var7: A value specific to the action requested
  var8: Address of the parallel port on which the key has been found or error code
The function cfgKey is defined more precisely below, with values taken as an entirely non-limiting example.
CfgKey is a value on 16 bits which makes it possible to ascertain the position of the key in the case of the use of several keys. The bits then form groups with the following meanings:
  bits 0 to 3: Number of editor registers in the key
    000: No key
    001: 32 registers
    010: 96 registers
    011: 224 registers
    100: 480 registers
    101: 992 registers
    110: 2016 registers
    111: 4064 registers
  bit 4: 0 the key is a multiprotection key (Pathway Functions 40 and 41)
    1 the key is a multiprotection key
  bit 5: 0 the key contains no protection register (see Functions 4 and 5)
    1 the key contains a protection register
  bit 6: 0 the key is not a clock key
    1 the key is a clock key
  bit 7: output indicator of the data (Ack or PE)
  bits 8 and 9: address of the parallel port or server number
  For a local-mode key the values are:
  00: no key
  01: 03bch
  10: 0378h
  11: 0278h
  For a network-mode key
  00: server number 0
  01: server number 1
  10: server number 2
  11: server number 3
  bits 10 to 12: Number of the key for stacked keys
    000: no key
    001: key number 1
    010: key number 2
    011: key number 3
    100: key number 4
    101: key number 5
    110: key number 6
    111: key number 7
  bits 13 to 14: location of the key
    00: no key
    01: key on the local station
    10: key on a Novell server
    11: key on a Netbios compatible server
  bit 15: Reserved
The function of cfgFun is described below:
  CfgFun is a value on 16 bits which makes it possible to ascertain the position of the key, or to request a login on a particular key. The meaning of the bits is as follows:
  bits 0 to 7: reserved
  bit 7: output indicator for the data (Ack or PE)
  bits 8 and 9: address of the parallel port or server number
  For a local-mode key the values are:
  00: no key
  01: 03bch
  10: 0378h
  11: 0278h
  For a network-mode key
  00: server number 0
  01: server number 1
  10: server number 2
  11: server number 3
  bits 10 to 12: Number of the key for stacked keys
    000: no key
    001: key number 1
    010: key number 2
    011: key number 3
    100: key number 4
    101: key number 5
    110: key number 6
    111: key number 7
  bits 13 to 14: location of the key
    00: no key
    01: key on the local station
    10: key on a Novell server
    11: key on a Netbios compatible server
  bit 15: Reserved
  CfgFun can be used to Login on a particular key. To do this, the bits must be set as a function of the search. A search may be made by specifying each group of bits independently.
  The location of the key (bits 13 and 14) is then selected by specifying the type of server sought or whether it is a local-mode key which is sought.
  Next, the number of the server or the parallel port is selected via bits 8 and 9.
  Finally, the number of the key is selected via bits 10 to 12.
  For example, to login only on key number 3 of server 2 of Novell type, the value of cfgFun will be: 0 10 011 10 0000 0000, i.e. 04E00h.
  During the login CfgFun+2 must be placed in var1 so that the login takes place only on the desired key.
  If cfgFun is not used during the login, cnrm searches for the first valid key for which the number of connections is not exhausted, over the whole of the network in the order:

Local
Novell server 0 to server 3
Netbios server 0 to server 3

The order of searching on the servers might not be complied with so as to increase the efficiency of the search, however cnrm always commences with a local-mode search.

The first three facilities of the cnrm function will now be described below, by way of example.

Function 00: Test for the Presence of the Local-mode key

Public: No
System: No
Read: No
Write: No
Write once: No
Password: Yes, if already initialized
SSII access: Function 64
Protection: No The function 0 makes it possible to ascertain whether a key of the developer is present. All the keys have a code allocated by the key manufacturer to each developer. They will be recognized irrespective of the contents of the various registers.

Contents of the variables

|  | Before_call | After_call |
| --- | --- | --- |
| Var1 | 0 + CfgFun | True |
| Var2 | Code0 | cfgKey |
| Var3 | Code1 | cfgFun |
| Var4 | Key0 or 0 if Key0 not initialized | 0 |
| Var5 | 0 | Duration of execution of the function |
| Var6 | 0 or unit of time or True | Time of start of execution of the function |
| Var7 | 0 | Version of the software or Date of the software |
| Var8 | 0 | Address of the parallel port |

Before Call: Initialization of the Variables

The values between [ ] are optional.

Var1: 0 [+cfgFun]–Function number. Add cfgFun for a local key so that the test is faster.
Var2: Code0—High-order bits of the editor code supplied by the key vendor
Var3: Code1—Low-order bits of the editor code supplied by the key vendor
Var4: 0 or password - if the password is not initialized, then 0 must be used, otherwise the password must be used.
Var5: 0
Var6: 1 or 2 or 3 or 4 or True: with the value True a request is made to return the date in var7. 1 makes it possible to request a duration of execution value in microseconds, 2 makes it possible to obtain the duration in milliseconds, 3 makes it possible to obtain the duration in clock ticks (55 ms), and 4 makes it possible to obtain a duration in seconds. For any other value the function returns a time in microseconds in Var6 and the version of the software in Var7.
Var7: 0—Reserved
Var8: 0—Reserved After call: Contents of the Variables if the Key is present Var1: True if the key is present, otherwise random value.
Var2: cfgKey—This value gives information about the location and the type of key.
Var3: cfgFun—This value gives information about the location and the type of key.
Var4: Always 0
Var5: Duration of execution of the call to the function. This time depends on the unit specified in var4, and constitutes only an approximate value. It is possible to obtain the exact values as follows:
If the time is expressed in microseconds, divide this value by 1.193180
If the time is expressed in milliseconds, divide this value by 1.193180
If the time is expressed in clock ticks, divide the value by 18.20648193 to obtain the time in seconds.
The time in seconds is that of the internal clock.
However, it should be noted here that in 32-bit protected mode (32-bit WINDOWS, 32-bit DOS EXTENDERS), the time is not returned.
Var6: Time of start of execution of the function.
The time is expressed in the unit specified by Var4
Here again, in 32-bit protected mode (32-bit WINDOWS, 32-bit DOS EXTENDERS), the time is not returned
Var7: Version of the software or date compacted. If before the call var6 contained True, then Var7 contains the date in the compacted format:
bits 15 14 13 8 7 6 5 4 3 2 1 0 12 10 9
Value Year+1980 Month Day
In the other cases var7 contains the version of the software to two decimal places. Example: 100 corresponds to version 1.00
Var8: Address of the parallel port on which the key is situated.

Function 01: Initialization of the Password (local only)

Public: No
System: Yes
Read: No
Write: No
Write once: Yes
Password: Yes, to initialize it
SSII access: Function 65
Protection:No On the first order from a developer, the key manufacturer allocates, for example, two codes Code 0 and Code 1. A third code is available for an initialization by the developer. However, for better management of the developer's keys, the manufacturer may also initialize it. In the mode described here the password will be written once only and it may neither be read nor modified. If the developer tries to reinitialize it, Var1 will contain a value different from True during the call. In this instance it is then recommended that the same password always be used after initialization. If the password is present, it will be obligatory in order to access all the functions.

Contents of the variables

|  | Before_call | After call |
| --- | --- | --- |
| Var1 | 0 + CfgFun | True |
| Var2 | Code0 | cfgKey |
| Var3 | Code1 | cfgFun |
| Var4 | Key0 password | 0 |

-continued

| | Contents of the variables | |
|---|---|---|
| | Before_call | After call |
| Var5 | to be initialized 0 | reserved |
| Var6 | 0 | reserved |
| Var7 | 0 | Value of the password written to the key |
| Var8 | 0 | Address of the parallel port |

Before call: Initialization of the Variables

The values between [ ] are optional.
Var1: 01 [+cfgFun]–Function number. Add cfgFun to select a particular local key.
Var2: Code0–High-order bits of the editor code supplied by the manufacturer
Var3: Code1–Low-order bits of the editor code supplied by the manufacturer
Var4: key 0=password to be initialized always different from 0.
Var5: 0
Var6: 0—Reserved
Var7: 0—Reserved
Var8: 0—Reserved After call: Contents of the Variables if the Key is Present and Key0 not Initialized Var1: True if the key is present, and was able to be initialized.
Var2: cfgKey—This value gives information about the location and the type of key.
Var3: cfgFun—This value gives information about the location and the type of key.
Var4: 0
Var5: Reserved
Var6: Reserved
Var7: Contains the value of the password written to the key provided that this is the first initialization of the latter. If the key is absent or already initialized, an unspecified value will be displayed.
Var8: Address of the parallel port on which the key is situated.

Function 02: Key Login

Public: No
System: Yes
Read: Yes
Write: No
Write once: No
Password: Yes
SSII access: Function 66
Protection: Yes This function allows an application to attach itself to a key, the objective being to guarantee that the latter is linked with the correct key when there are several. Login also makes it possible to set up the channel with the key server in the network environment.

Usually, an application which uses login is designed to operate in all possible cases:
  one or more local-mode keys
  one or more network-mode keys
  one key for several application packages
  several applications on identical keys (same editor)

It is obligatory to go via login in order to be able to execute the functions of index higher than 2.

It is possible either to carry out a general login (var6=var7 var8=0 on calling), or a login on a register (var6=True, Var7=register number and var7=value which the register must contain). The number of connection to the key server will always be counted by the machine, hence a machine can make as many logins as it desires, while using up just a single connection.

In what follows, the general login is regarded as a login on register number −1, for any value: it is therefore also a register login.

| | Contents of the variables | |
|---|---|---|
| | Before call | After call |
| Var1 | 02 + CfgFun | True |
| Var2 | Code0 | cfgKey |
| Var3 | Code1 | cfgFun |
| Var4 | Key0 | cfgLog or 0 in the event of a memory error |
| Var5 | 0 | Number of connections still available (for the logged key) |
| Var6 | True | Number of connections already installed (for the logged key) |
| Var7 | Value of the register (application code) | Maximum number of connections permitted (for the logged key) |
| Var8 | Address of the register | Address of the parallel port |

Before call: Initialization of the Variables

The values between [ ] are optional.
Var1: 02 [+cfgFun]—Function number. Add cfgFun to select a particular key.
Var2: Code0—High-order bits of the editor code supplied by ACTIKEY
Var3: Code1—Low-order bits of the editor code supplied by ACTIKEY
Var4: key 0 password
Var5: 0
Var6: 0 or True for a login on a register
Var7: Value of the register (application code) if Var6=True
Var8: Address of the register if Var6=True After call: Contents of the Variables if the Key is Present and Login has Occurred Correctly Var1: True if the key is present, otherwise random value. A value of 0 indicates a login error for which the error code is in var8. This error code corresponds to that returned by the last server encountered.
  0: Memory allocation error
  1: Failure to initialize the network APIs : No network driver
  2: Failure to connect with the network
  APIs: Network operating error
  3: No key server has been found
  4: Error in dialog with the key server
  5: Access refused since the user has not logged on
  6: Access refused since the maximum number of connection has been reached 10: IPX not installed
11: Impossible to open a socket
254: Key absent
255: Unexpected error
Var2: cfgKey—This value gives information about the location and the type of key.
Var3: cfgFun—This value gives information about the location and the type of key.
Var4: cfgLog: login handle to be used in all subsequent calls
Var5: Number of connections still available if the network is connected
Var6: Number of connections already installed if the network is connected
Var7: Maximum number of connections permitted
Var8: var8: Address of the parallel port on which the key is situated.

How to Provide Protection with the Function 02

This function allows and guarantees the unique association between an application and a key, even within the framework of networks (for network keys). As a general rule, a register is defined per application, with internally an application code which will be the version number of the application. The software then performs a login which will find the key which corresponds to the application and to its version, doing so in single-station or network mode, irrespective of the number of keys present. Thus, the same key can be programmed to operate on several application packages. In network mode it is possible to protect up to 1024 users with a single key, by installing it on the server for NOVELL or on a station for NOVELL or NETBIOS.

Var1: Its value must always be equal to True. If you have some other value, either the key is absent or login has failed
Var2: Do not use to provide protection.
Var3: Do not use to provide protection
Var4: cfgLog: login handle. This value of var4 must be retained for calls to the other functions of index higher than 2. Each login returns a different cfgLog, and as many logouts must be made as logins in order to release the connection of the keys in network mode. If var4 contains a 0 after the call, then the login has failed and no subsequent function can succeed.
Var5: Number of users available for the connection
Var6: Number of users connected at the moment of the call
Var7: Maximum number of users permitted
Var8: Address of the parallel port. The constructors implement the parallel ports at the addresses 0378h, 0278h and 3BCh. If you obtain a different value it is certain to be because a replacement routine has been installed, in which case it would be better to exit the program. It is also possible that the machine may not possess a non-compatible parallel port. In the latter case the key is not usable.

See function 47 to ascertain the number of logins on a register per machine, and number of logins on a register for the whole of the network.

The other functions 03, 04, etc. are defined so as to obtain the results sought.

They are programmed in a manner known per se to the person skilled in the art, in a similar manner to the three functions specified above.

In advantageous embodiments and in order to cater for a larger number of cases in point, the function cnrm is additionally supplemented with other functions.

Let us recall that in all the declarations below, and for a Windows platform (16 or 32 bits) it is necessary to qualify the functions of WINAPI.

The following modes are thus provided for:

a—Function cnrm with passing of parameters by value

Model integer cnrm(value var1, value var2, value var3, value var4, value var5, value var6, value var7, value var8)
Declaration in C int cnrm(int var1, int var2, int var3, int var4, int var5, int var6, int var7, int var8);
Declaration in Pascal Function cnrm(var1, var2, var3, var4, var5, var6, var7, var8: integer): integer;

It should be observed that the name of the function is the same as in the case of passing by reference. The only difference stems from the fact that in the first case references are transmitted to the function, whereas in the second case values are transmitted to the function.

The definition of the arguments is similar to that already described.

On the other hand, to obtain the contents of the variables after the call, the function cnrmvar described below will be used.

Additionally, it is entirely possible to mix the types of call in the same program, for example login can be carried out by value, and the reading of a register can be carried out by reference.

b—Function Cnrmvar

Cnrmvar is a function which makes it possible to retrieve the post-call parameters of cnrm for the latest call if login has been successful.

It is mainly used together with the calling of cnrm by value, but can also be called in the case of calls by reference: in this case this makes it possible to store in memory the state of the values returned until the next call to cnrm.
Model integer cnrmvar(int cfgLog, int numVar)
Declaration in C int cnrmvar(int cfgLog, int numVar);
Declaration in Pascal Function cnrmvar(cfgLog, numVar: integer): integer;
  cfgLog: Value returned during login numVar: 1 to 8: request to return var1 to var8 respectively
    9: request to return the error code of the latest call to cnrm
    10 to 13: request to return the error code received from the NOVELL type key servers for server number 0 to 3 respectively
    20 to 23: request to return the error code received from the NETBIOS type key servers for server number 0 to 3

For all the other values of numVar, cnrmvar returns cfgLog

An example of the mode of operation is given below:

EXAMPLE

// login is assumed to be correct
cfgLog=cnrm(13, 12127, 2221, 1654, cfgLog, 0, 0, 0); // reading register 0 passing by value
if (cnrmvar(cfgLog, 1)==True) {// test if var1 =True<==>action successful
v=cnrmvar(cfgLog, 7); // v contains the value of register 0
} c—Function Cnrmcb: Definition of a Return Call

The return call (or callBack) is a function which will be called by cnrm during calls following the fetch by cnrmcb.

The interest in it lies in the possibility of ascertaining which operation cnrm is performing, of halting execution of cnrm prematurely, but also of improving protection by making it possible indirectly to call important functions of the protected application software during the execution of cnrm. This function considerably increases the protection of programs which use cnrm in the form of a dynamic library (DLL), if it defines a callBack of an application-critical function, such as for example the initialization of sensitive data, one of the components of which is stored in the key.

Callback will only be done for actions of index>2, and only if login is successful.

We have:
Model integer cnrmcb(int cfgLog, reference cb, integer unsigned long Object)
Declaration in C int cnrmcb(int cfgLog, callBack *cb, unsigned long Object);
Declaration in Pascal
Function cnrmcb(cfgLog: Integer; cb: _callBack; Object: longInt): integer; far; external;
  cfgLog: value received during login
  cb: address of the return function
  Object: a value which will always be transmitted to the function called back
  cnrmcb always returns cfgLog, hence if cfgLog is invalid it is the value 0
The general form of the function called back is moreover as follows:
Model int callBack(unsigned long Object, int E, int SE, int cfgLog);
Declaration in C typedef int _callBack(unsigned long Object, int E, int SE, int cfgLog);
Declaration in Pascal
  type _callBack=Function(Object: longint; E: integer; SE: integer; cfgLog: integer): integer;
  If callBack returns the value 0 then execution of cnrm is halted in the current state, otherwise the execution of cnrm continues.
  "Object" is an unsigned integer which is left available: in general a pointer this for a C++ object is placed thereon. Object has been given during the fetch of the callBack
  E is the value of the internal state of cnrm at the time of the call to callback
  E=0=START: begin cnrm
  E=1=LOCAL: before calling cnrm in local mode (local test)
  E=2=NOVELL before calling cnrm on NOVELL
  E=3=NETBIOS: before calling cnrm on NETBIOS
  E=255=END: before exiting cnrm
  The order of the calls is guaranteed only for E=0 and E=255. The other states may be given several times in any order.
  SE gives sub-state information which depends on E.
  if E=0 or E=255, SE always equals 0
  if E=1, SE can take values from 1 to 99
  if E=2, SE can take values from 1 to 99
  if E=3, SE can take values from 1 to 99
  CfgLog makes it possible to retrieve the state of the variables passed as parameter during the call to cnrm for all the values of E<255, or the values after the call for all the values of E>=255.
  The callBack function must not call cnrm except if E=255, but it can call cnrmcb to fetch a new function back which will be called for the next state, or call cnrmccb to cancel the callBack. If the callBack function calls cnrm for E<>255, nothing will happen.
  On the other hand if E=255, cnrm is called normally, but without calling the function back. Therefore, no precaution needs to be taken in the callBacks to avoid recursion since it cannot occur.

d—Function Cnrmccb: Cancelling a Callback

Callback is a function which will be called by cnrm during calls following the fetch by cnrmcb. It is possible to delete this callback at any time, even within a callBack function, with the help of cnrmccb
Model integer cnrmccb(int cfgLog)
Declaration in C int cnrmccb(int cfgLog);
Declaration in Pascal Function cnrmccb(cfgLog: Integer): integer; far; external,
  cfgLog: value received during login
  cnrmccb always returns cfgLog, hence if cfgLog is not valid it is 0 e—Function Cnrmseg: Returns the Segment of a Variable (16-bit Environment only)

The function cnrmseg returns the segment of a far type variable. It is generally used with languages which do not allow the segments and offset to be retrieved (example: VISUAL BASIC).
Model int cnrmseg(void far *s); // with s the variable whose segment is to be extracted
Declaration in C int cnrmseg(char far *s);
Declaration in Pascal Function cnrmseg(p: pointer): integer; far; external;

f—Function Cnrmoff: Returns the Offset of a Variable (16-bit Environment Only)

The function cnrmoff returns the segment of a far type variable. It is generally used with languages which do not allow the segments and offset to be retrieved (example: VISUAL BASIC).
Model int cnrmoff(void far *s); // with s the variable whose segment is to be extracted
Declaration in C int cnrmoff(char far *s);
Declaration in Pascal Function cnrmoff(p: pointer): integer; far; external;

Whether it be in the form of a static library (.LIB or .OBJ). or in the form of dynamic libraries, the functions described above are all accessible, (however, cnrmseg and cnrmoff are only meaningful for the 16-bit environments).

Two examples of protections will now be described according to the embodiments of the invention more particularly described here.

These examples are given by way of indication, the objective of the protections given here being to be reliable by guaranteeing a dependence of the application on the contents of the key, and a genuine execution of the software interfaces is for access to the key.

This type of protection is especially recommended when using DLL.

In the modes described more particularly below, an external encryption tool to be applied to the final executable programme is moreover called upon.

This tool is the same for both applications and is given by way of non-limiting example.

In all cases, the developer will have to adapt it as a function of his particular case.

The two examples enlist an application for calculating the diameter of a circle, its circumference, the volume of a cylinder based on the circle and the weight of said cylinder. The result is displayed each time.

The first example is in the C language, the source provided here being in the 16-bit environment.

Here, the principle of protection is to choose a few sensitive functions of the software to be protected, to mask the entry point of these functions by an indirect call, and to encrypt the structure which contains the entry point of said functions.

Thus, the key is guaranteed to be properly read otherwise decryption will not be performed, and in this case the entry points of the functions are not valid.

If a normal user who has a licence does not put in his key, he will obtain the "key absent" message.

If a pirate tries to replace the key or to delete the test for the presence of the key, decryption is not carried out and in this case the entry points of the functions are not valid.

Encryption is carried out by an external program after compilation and link editing. It uses the string TAG1 which must be unique to find the area to be encrypted and the length of said area.

The sole objective of the string TAG1 is the identification of a data section seen by the external program, the latter being unable to read the sources of the program to be protected.

Figure 5:
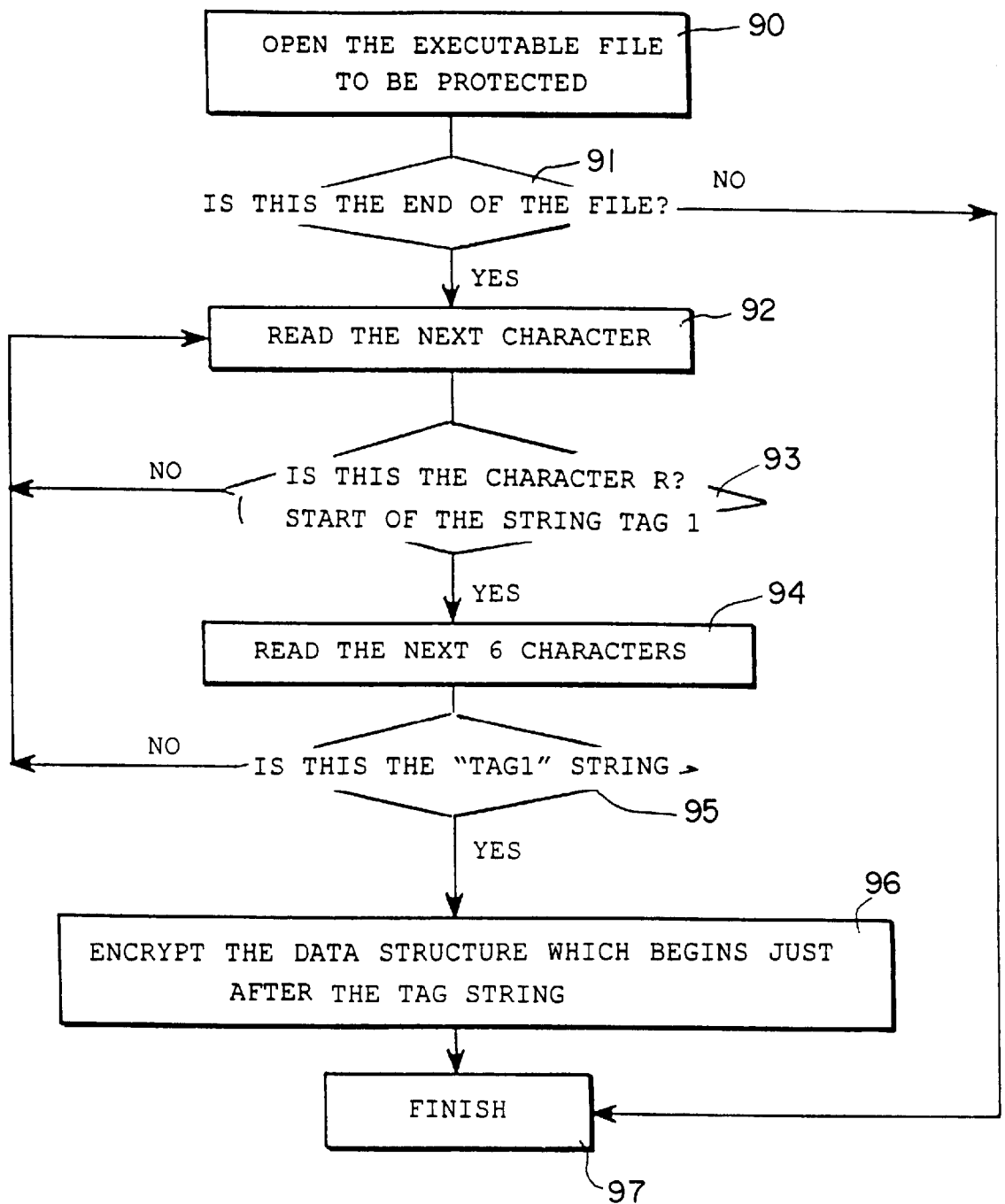
FIG. 5 shows a flowchart of an encryption process used in an embodiment of the invention.

An example of the mode of operation of this encryption program is specified with reference to FIG. 5.

More precisely the program R1 includes a first step 90 in which the executable file to be protected is opened, followed by a test 91 on the end of the file.

If the file has not terminated, the routine is halted (step 97).

If the end of the file is observed, a step 92 for reading the next character is undertaken, followed by a test 93 for comparing the character read with a reference character R, which is the character of the start of the so-called TAG1 string.

If this is not the correct character, the next character is then read (return to step 92), otherwise the next n characters are read (step 94), for example six characters.

A test step 95 is then performed to verify whether this is the so-called TAG1 string.

If this is not the case, we return to step 92, if it is the case, step 96 for encrypting the data structure is then initiated just after the TAG1 string.

Once encryption has been performed, the relevant routine is halted (step 97).

```
#include <windows.h>
#include <stdio.h>
#include <stdlib>
#include "ACTIKEY.H"
//#define __DEBUG__1 /* makes it possible to tailor the
program withour protection */
// codes of the key
#define           NoCli 4000    //            customer
reference
#define           code0 12127   //   editor   code
No 0
#define           code1 2221    //   editor   code
No 1
#define           key0 1654     //            editor
password
#define           true 12345    //   if       key
present
// work variables for key
int cfgLog, var1, var2, var3, var4, var5, var6, var7,
var8;
const double pi = 3.1415;       "As its name indicates"
// initial values
double R = 10.0; // radius of 10 Cm
double H = 10.0; // height in Cm
double D = 1.0; // density in G/Cm3
// declaration of the functions
void compute (HWND hwnd);
// declaration of the functions to be protected
// it must be declared near for this to work
// if they are called by an external module it must be
done through a call
// through a far function in this module which calls
the near function
// example : double farDiameter(double radius) {return
diameter(radius);}
double near diameter(double radius);
double near circumference(double radius);
double near volume(double radius, double height);
double near weight(double radius, double height, double
density);
void near displayResult (HANDLE hwnd, int ctrl, double
value); // display function
// special declarations for protection
typedef void near fV_V(void); // function with a void
parameter which returns a void
typedef double near fD_D(double p1);    //   Double
parameter function which returns a double
typedef double near fDD_D(double p1, double p2); //
function with two double parameters which returns a
```

-continued

```
double
typedef double near fDDD_D(double p1, double p2, double
p3); // function with three double parameters which
returns double
typedef void near fHID_V(HANDLE hwnd, int ctrl, double
p2);
// function which has a parameter HANDLE, Int and
Double which returns Void
// ATTENTION THIS ASSUMES THAT ALL THE FUNCTIONS ABOVE
ARE IN THE
// SAME SEGMENT OF CODE
// HENCE THEY MUST BE PLACED IN THE SAME SOURCE FILE AS
_ref void near _ref(void {;}      //    empty reference
function
typedef struct {
    char tag[10];   //    serves to encrypt
    int nbFunction;    //    number of functions in the
structure
    fV_V near *ref;    //    serves to have a reference
    fD_D near *diameter;
    fD_D near *circumference;
    fDD_D near *volume;
    fDDD_D near *weight;
    fHID_V near *displayResult;
} _fct;
_fct fct = {
        "*TAG1*",              //    tag
        6         //    6 functions
        _ref,       //    entry point: entry
number 0
        diameter,     //    function 1
        circumference,     //    function 2
        volume,         //    function 3
        weight,         //    function 4
        displayResult// function 5
};
// the structure as global variable
_fct fct;
#define CODE_.SOFTWARE 6754;   //   a code to make sure
this is the correct key
#define REG_SOFTWARE        0    //   in register 0
// end of declarations for protection
// protos of cnrm
int WINAPI cnrm(int far *var1, int far *var2, int far
*var3, int far *var4,
        int far *var5, int far *var6, int far *var7,
int far *var8);
int WINAPI cnrmseg (void far *s);
int WINAPI cnrmoff (void far *s);
// Program
// declaration of the procedure of the dialog window
BOOL CALLBACK WindowProc(HWND hwndDlg, UINT msg, WPARAM
wParam, LPARAM lParam);
// main program
#pragma argsused
int  PASCAL    WinMain(HANDLE   hInstance,    HANDLE
hPrevInstance, LPSTR lpCmdLine, int nCmdShow)
{
        DLGPROC dlgProc;
        int delta;
        // login key
        var1=2;
                var2=code0;
                var3=code1;
                var4=key0;
                var5=0;
                var6=true;
                var7=CODE_SOFTWARE;
                var8=REF_SOFTWARE;
    cfgLog=cnrm(&var1,&var2,&var3,&var4,&var5,&var6,
&var7,&var8);
        if (cfgLog && var1 == true) {
        // the key is present
#ifndef _DEBUG_
        // install protection and do calculations for
correct execution
        // request decryption of the structure
        var1=30;
            var2=code0;
```

```
                var3=code1;
                var4=cfgLog;
                var5=cnrmseg(&fct.ref);
                var6=cnrmoff(&fct.ref);
var7=fct.nbFunction * 2;   //   2 bytes per
pointer since these are NEAR functions
                var8=0;
    cfgLog=cnrm(&var1,&var2,&var3,&var4,&var5,&var6,
&var7,&var8);
            // end of installation of protection
#endif
            // the dialog window responsible for carrying
out the work is opened
            dlgProc =
MakeProcInstance((FARPROC)WindowProc, hInstance);
        DialogBox(hInstance, "ACTIKEY", NULL, dlgProc);
        FreeProcInstance((FARPROC) dlgProc);
        }
        else {
                MessageBox(NULL, "Error : Key absent !",
"ACTIKEY", MB_OK);
        }
        // key logout
    var1=3;
        var2=code0;
        var3=code1;
        var4=cfgLog;
        var5=0;-
        var6=0;
        var7=0;
        var8=0;
    cfgLog=cnrm(&var1,&var2,&var3,&var4,&var5,&var6,
&var7,&var8);
            return 0;
}
// Callback procedure associated with the dialog window
#pragma argsused
BOOL CALLBACK WindowProc(HWND hwndDlg, UINT msg, WPARAM
wParam, LPARAM lParam)
{
            switch (msg) {
            case WM_COMMAND:
                if (LOWORD(wParam) == IDOK) {
                    // end button : exit
                    Post Message(hwndDlg, WM_CLOSE, 0, 0);
                        return 1;
                }
                if (LOWORD(wParam) == IDC_CALCUL) {
                    // the results are recalculated as a
function of the data
                            compute (hwndDlg):
                            return 1;
                }
                    break
            case WM_CLOSE :
                EndDialog(hwndDlg, 0);
                return 1;
            case WM_INITDIALOG :
                // the controls are completed with the
default values
#ifdef_DEBUG_
            displayResult(hwdnDlg,     IDC_RADIUS,   R);
// unprotected direct call
            displayResult(hwdnDlg,     IDC_HEIGHT,   H);
// unprotected direct call
            displayResult(hwdnDlg,     IDC_DENSITY,  D);
// unprotected direct call
#else
                fct.displayResult(hwdnDlg,     IDC_RADIUS,
R); // protected indirect call
                fct.displayResult(hwdnDlg,     IDC_HEIGHT,
H); // protected indirect call
                fct.displayResult(hwdnDlg,     IDC_DENSITY,
D); // protected indirect call
#endif
            // and we calculate the results
            compute (hwndDlg);
            return 1;
        } // end switch
```

```
                return 0;
        }
        void compute(HWND hwnd)
        {
                char buf[37];
#ifdef __DEBUG__
                // conventional method of calling the functions
without protection
                GetDIgItemText(hwnd, IDC_RADIUS, buf, 37);
                R = strtod(buf, NULL);
                displayResult(hwnd, IDC—RADIUS R);
                GetDIgItemText(hwnd, IDC_HEIGHT, buf, 37);
                H = strtod(buf, NULL);
                displayResult(hwnd, IDC_HEIGHT, H);
                GetDIgItemText(hwnd, IDC—DENSITY, buf, 37);
                D = strtod (buf, NULL);
                displayResult(hwnd, IDC_DENSITY, D);
                displayResult(hwnd, IDC_DIAMETER, diameter(R));
                displayResult(hwnd, IDC_CIRCUMFERENCE,
circumference(R));
                displayResult(hwnd, IDC_VOLUME, volume(R, H));
                displayResult(hwnd,    IDC_WEIGHT,    weight(R,    H,
D));
#else
                // method of calling protected functions
                // the difference lies in the prefix fct. in
front of the name of the function according to the
declarations
                // this is an indirect call for which there is
no known entry point
                // since it is calculated when the protection
is put in place
                // the values are recovered in the input fields
                GetDIgItemText(hwnd, IDC_RADIUS, buf, 37);
                R = strtod(buf, NULL);
                // and they are overwritten so as to supply the
value actually used
                fct.displayResult(hwnd, IDC_RADIUS, R); // call
                GetDIgItemText(hwnd, IDC_HEIGHT, buf, 37);
                H = strtod(buf, NULL);
                // and they are overwritten so as to supply the
value actually used
                fct.displayResult(hwnd,    IDC_HEIGHT,    H); //
protected call
                GetDIgItemText(hwnd, IDC_DENSITY, buf, 37);
                D = strtod(buf, NULL);
                // and they are overwritten so as to supply the
value actually used
                fct.displayResult(hwnd,    IDC_DENSITY,   D); //
protected call
                fct.displayResult(hwnd,              IDC_DIAMETER,
fct.diameter(R));
                fct.displayResult(hwnd, IDC_CIRCUMFERENCE,
fct.circumference(R));
                fct.displayResult(hwnd,                  IDC_VOLUME,
fct.volume(R, H));
                fct.displayResult(hwnd,                  IDC_WEIGHT,
fct.weight(R, H, D));
                // this call makes a protected call of
                                                    //       its
own!!!
#endif
        }
        double near diameter(double radius) {
                return radius * 2;
        }
        double near circumference(double radius)
        {
                return 2 * pi * radius;
        }
        double near volume(double radius, double height)
        {
                return pi * radius * radius * height;
        }
        double near weight(double radius, double height, double
density)
        {
#ifdef __DEBUG__
                // call normal
```

-continued

```
        return volume(radius, height) * density;
#else
        // protected call
        return fct.volume(radius, height) *density;
#endif
}
void near displayResult(HANDLE hwnd, int ctrl, double
v)
{
        char buf[37]; // for temporary storage
        sprintf(buf, "%f", v);
    SetDlgItemText(hwnd, ctrl, buf);
}
```

The second example is that of an application with a very high level of protection in Visual Basic.

This application calls upon a DLL and does not allow the use of techniques which are possible with C.

```
Begin VB.Form Form1
        '     description of the visual objects and
controls
        '     they comprise controls on the display of
named results
              ' Diameter, Circumference, Volume, Weights
End
Attribute VB_Name = "Form1"
Attribute VB_Creatable = False
Atribute VB_Exposed = False
'Protection demonstration program
'The principle here consists in masking the names of
the controls and the important constants in the code
They are encrypted by an external program vbCrypte.exe
To do this they are stored in a constant which can
appear once only
'throughout the application
The structure of this string is as follows:
'     TAG: a unique string (*TAG1* for this example)
'     The size of the elements to be encrypted in the
string on 3 characters
'     The elements to be encrypted preceded by a space
'     an ending space
'     example for 2 names of controls to be encrypted
'     "*TAG1*020 control1 control2"
'Hence, we count all the space characters lying after
the length
'Owing to the nature of Visual Basic we cannot merely
store the constant
'somewhere in the code, else it would not be retrieved
by the encryption tools. The trick therefore consists
in storing it in an invisible control
'#Const DEBUG_ = 1 'Set to 1 for deburg 0 for
definitive version
'For protection
' Declaration of the APIs of cnrm
Private Declare Function cnrm Lib "CNRMA000.DLL" (ByRef
V1 As Integer ByRef v2 As Integer, ByRef v3 As Integer,
ByRef v4 As Integer, ByRef v5 As Integer, ByRef v6 As
Integer, ByRef v7 As Integer, ByRef v8 As Integer) As
Integer
Private Declare Function cnrmseg Lib "CNRMA000.DLL"
(ByVal s As String) As Integer
Private Declare Function cnrmoff Lib "CNRMA000.DLL"
(ByVal s As String) As Integer
' Code of the key
Const NoCli = 4000      ' customer no.
Const code0 = 12127     '  customer code 0 high-order
bit
Const code1 = 2221      '  customer code 1 low-order
bit
Const key0 = 1654       ' customer password
Const true = 12345      ' true if key present
' work variables
Dim cfgLog As Integer
Dim var1 As Integer
```

-continued

```
Dim var2 As Integer
Dim var3 As Integer
Dim var4 As Integer
Dim var5 As Integer
Dim var6 As Integer
Dim var7 As Integer
Dim var8 As Integer
' Declaration of the constants for the application
Dim Pi As Double ' = 3.1415 : will also be encrypted
'Initial values
Const Rini = 10#
Const Hini = 10#
Const Dini = 10#
' Work variables
Dim R As Double
Dim H As Double
Dim D As Double
' the names of the controls after decryption
Dim cD As String 'Diameter
Dim cC As String 'Circumference
Dim cV As String 'Volume
Dim cP As String 'Weight
Sub DisplayResult( )
    ' Display the result
#If DEBUG_ Then
    Diameter.Text    =    Format(ComputeDiameter(R), "0.0000")
    Circumference.Text    =    Format(ComputeCircumference(R), "0.0000")
    Volume.Text    =    Format(ComputeVolume(R, H), "0.0000")
    Weight.Text    =    Format(ComputeWeight(R, H, D), "0.0000")
#Else
    Controls("Diameter").Text = "toto"
    Controls(cD).Text    =    Format(ComputeDiameter(R), "0.0000")
    Controls(cC)    =    Format(ComputeCircumference(R), "0.0000")
    Controls(cV)    =    Format(ComputeVolume(R, H), "0.0000")
    Controls(cP)    =    Format(ComputeWeight(R, H, D), "0.0000")
#End If
End Sub
Sub calcul( )
    Dim V As Variant
    R = CDbl(Radius.Text)
    H = CDbl(Height.Text)
    D = CDbl(Density.Text)
    ' Reset the values properly
    Radius.Text = Format(R, "0.0000")
    Height.Text = Format(H, "0.0000")
    Density.Text = Format(D, "0.0000")
    DisplayResult
End Sub
Function ComputeCircumference(R As Double) As Double
    ' calculate the circumference
    ComputeCircumference = 2 * Pi * R
End Function
Function ComputeDiameter(R As Double) As Double
    ' calculate the diameter
    ComputeDiameter = R * 2
End Function
Function ComputeWeight(R As Double, H As Double, D As Double) As Double
    ' compute the weight
    ComputeWeight = ComputeVolume(R, H) *D
End Function
Function ComputeVolume(R As Double, H As Double) As Double
    ComputeVolume = Pi * R * R * H
End Function
Private Sub bCompute_Click( )
    compute
End Sub
Private Sub bExit_Click( )
    Unload Screen.ActiveForm
End Sub
```

-continued

```
Private Sub Form_Load( )
        ' here we must set in place the operating elements
of the program
        ' hence decrypt the string so as to address the
correct controls
        ' Retrieval of the string to be encrypted : it is
unique for the whole code
        fct = fct_.Text '"TAG1*043 3.1415 Diameter
Circumference Volume Weight --"
        ' the ending -- serve no purpose other than to
verify through a dump that
        ' the encryption is correct
        Dim s As String
        ' Login key
        var1 = 2              'Function 2 Login
        var2 = code0          'editor code 0
        var3 = code1          'editor code 1
        var4 = key0           'password
        var5 = 0              '
        var6 = 0              '
        var7 = 0              '
        var8 = 0              '
        ' call the function CNRM
        cfgLog = cnrm(var1, var2, var3, var4, var5, var6,
var7, var8)
        If (var1 < > true) Then
            MsgBox "Error key absent !", MB_OK, "ACTIKEY"
            End
        End If
        ' set up protection
        s = Mid$(fct, InStr(fct, " ")) ' the only piece to
be decrypted
        var1 = 30             'Decryption function
        var2 = code0          'editor code 0
        var3 = code1          'editor code 1
        var4 = cfgLog         'cfgLog
        var5 = cnrmseg(s)
        var6 = cnrmoff(s)
        var7 = Len(Mid$(fct, InStr(fct, " "), Len(fct)))
'the length
        var8 = 0          '
        ' call the function CNRM
        cfgLog = cnrm(var1, var2, var3, var4, var5, var6,
var7, var8)
        ' normally this is decrypted
        ' extract the first element (Pi)
        s = Mid$(s, 2, Len(s)) 'skip the first space
        Pi = Val(Mid$(s, 1, InStr(s, " ") - 1))
        ' extract the second element (cD)
        s = Mid$(s, InStr(s, " ") + 1, Len(fct))
        cD = Mid$(s, 1, InStr(s, " ") -1)
        ' extract the next element
        s = Mid$(s, InStr(s, " ") + 1, Len(fct))
        cC = Mid$(s, 1, InStr(s, " ") -1)
        ' extract the next (cV)
        s = Mid$(s, InStr(s, " ") + 1, Len(fct))
        cV = Mid$(s, 1, InStr(s, " ") - 1)
        ' extract the last (cP)
        s = Mid$(s, InStr(s, " ") + 1, Len(fct))
        cP = Mid$(s, 1, InStr(s, " ") - 1)
        ' End setup of protection
        ' Initial states
        Radius.Text = Format(Rini, "0.0000")
        Height.Text = Format(Hini, "0.0000")
        Density.Text = Format(Dini, "0.0000")
        compute
End Sub
Private Sub Form_Unload(Cancel As Integer)
        ' do a key logout
        var1 = 3              'function 3 Logout
        var2 = code0          editor code 0
        var3 = code1          editor code 1
        var4 = cfgLog         'Login
        var5 = 0
        var6 = 0
        var7 = 0
        var8 = 0
        ' call the function CNRM contained in the file
```

-continued

```
CNRMCxxx.DLL
    cfgLog =cnrm(var1, var2, var3, var4, var5, var6,
var7, var8)
End Sub
```

As goes without saying and as moreover follows from the foregoing, the present invention is not limited to the embodiments more particularly described, but on the contrary embraces all variants thereof and especially those in which other methods of encryption are used.

What is claimed is:

1. A process for authorizing and controlling the use of a software developed under a specified platform, associated with a device provided with an electronic circuit with read/write memory, the device being connected to terminals of a parallel port between a computer and a peripheral apparatus, wherein signals are processed in the device and/or are returned from the device to the computer in response to signals transmitted from the computer, said process comprising the steps of:

writing to or reading from the circuit of the device by calling upon a function built into an object file or a Dynamic Library File previously inserted into the software, said function having the following form:

result=cnrm (var1, var2. . . varn) with n>3 in which var1 to varn correspond to particular values depending on what the software is desired to execute with the device and to at least one specific value corresponding to a specified user, detecting automatically the type of specified platform, with said function, and calculating software execution context as a function of the platform.

2. The process according to claim 1, wherein during implementation of a linking function between the software and the device, said process further comprises the steps of:

identifying the key and/or position of the key by way of a specific value given or not given by the software, p1 storing the specific value in memory, and using the specific value later as a constant when operating the software.

3. The process according to claim 1, wherein the function cnrm is devised so as to recall the software at least once while operating, so as to verify that it is indeed the original cnrm which has been called.

4. The process according to claim 1, wherein the specified platform is devised so as to allow automatic recognition of the type of passing of parameters by reference to or by value implemented within the software.

5. The process according to claim 4, wherein the execution context is set up once only, during a first implementation of a function linking the software and the device.

6. The process according to claim 1, wherein n is equal to 8.

7. The process according to claim 1, further comprising a method of protection in which at least one sensitive function of the software to be protected is chosen, the entry point of said sensitive function being masked by an indirect call, and the structure which contains the entry point of said sensitive function being encrypted.

8. The process according to claim 1, further comprising a method of protection in which at least one control function or one significant constant is chosen, and said control function or said constant is encrypted.

9. The process according to claim 7, wherein the encryption is carried out by an external program after compilation and link editing.

10. A system for interactive authorization and control of the use of items of software developed under a specified platform and comprising at least one device provided with an electronic circuit with read/write memory, the device being connected to terminals of a parallel port between a computer and a peripheral apparatus, wherein signals are processed in the device or are returned from the device to the computer in response to signals transmitted from the computer, said system comprising:

means for writing to or reading from the electronic circuit of the device by calling upon a function built into an object file or a Dynamic Library File previously inserted into the software, said function having the following form:

result=cnrm (var1, var2. . . varn) with n>3 in which var1 to varn correspond to particular values depending on what the software is desired to execute with the device and to at least one specific value corresponding to a specified user, means for automatically detecting the type of specified platform using said function, and means for calculating software execution context as a function of the platform.

11. The process according to claim 8, wherein the encryption is carried out by an external program after compilation and link editing.

12. A process for controlling and authorizing the use of a software developed under a specified platform, associated with a device provided with an electronic circuit with read/write memory, connected to terminals of a parallel port between a computer and a peripheral apparatus, said process comprising the steps of:

performing a log-in of the device comprising allocating a memory stack in the read/write memory for storing return data from the computer including elements of the specified platform;

writing or reading from the circuit of the device by calling upon a function built into an object file or a Dynamic Library file previously inserted into the software, said function having the following form:

result=cnrm (var1, var2, . . . varn) with n>3, in which var1 to varn correspond to particular values depending on what the software is desired to execute with the device and to at least two specific values corresponding to a specified user and to an editor of the software;

providing the editor value to the stack, software interfaces being customized based on the editor value;

analyzing content of the stack in order to avoid passing by reference, to pass by value which authorizes a programmer, while installing the device, to choose a mode of operation irrespective of language of the software or state of compilation of the software;

detecting automatically the type of specified platform; and calculating software execution context as a function of the platform.

13. The process according to claim 2, wherein the specified platform is devised so as to allow automatic recognition of the type of passing of parameters by reference to or by value implemented within the software.

14. The process according to claim 13, wherein the execution context is set up once only, during a first implementation of the linking function.

* * * * *